US009098100B2

(12) United States Patent
Endo et al.

(10) Patent No.: US 9,098,100 B2

(45) Date of Patent: Aug. 4, 2015

(54) VOLTAGE REGULATOR WITH IMPROVED REVERSE CURRENT PROTECTION

(71) Applicant: Seiko Instruments Inc., Chiba-shi, Chiba (JP)

(72) Inventors: Daiki Endo, Chiba (JP); Yotaro Nihei, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 257 days.

(21) Appl. No.: 13/772,095

(22) Filed: Feb. 20, 2013

(65) Prior Publication Data

US 2013/0221939 A1 Aug. 29, 2013

(30) Foreign Application Priority Data

Feb. 29, 2012 (JP) ................................ 2012-043224

(51) Int. Cl.
*H02M 3/156* (2006.01)
*G05F 1/10* (2006.01)

(52) U.S. Cl.
CPC ........................................ *G05F 1/10* (2013.01)

(58) Field of Classification Search
CPC ... H02M 3/156; H02M 3/1588; H02M 3/158; H02M 3/1584; Y02B 70/1466
USPC ......... 323/223, 224, 271–273, 276, 279, 280, 323/282, 901
See application file for complete search history.

(56) References Cited

U.S. PATENT DOCUMENTS 4,578,633 A * 3/1986 Aoki ............................ 323/315
2011/0062921 A1* 3/2011 Sudou .......................... 323/273

FOREIGN PATENT DOCUMENTS

JP 2011-065634 A 3/2011

* cited by examiner

*Primary Examiner* — Adolf Berhane
*Assistant Examiner* — Yemane Mehari
(74) *Attorney, Agent, or Firm* — Brinks Gilson & Lione

(57) ABSTRACT

There is provided a voltage regulator equipped with a reverse-current prevention function capable of ensuring safe performance without causing a large overshoot at an output terminal against a sharp fluctuation in source voltage. The voltage regulator provides a source voltage fluctuation detecting circuit for detecting a fluctuation in source voltage in a comparison circuit for comparing the source voltage with output voltage so that when the source voltage rises sharply, the current through constant current circuits for limiting the consumption current of the comparison circuit will be increased to improve the response characteristics.

3 Claims, 3 Drawing Sheets

VOLTAGE REGULATOR WITH IMPROVED REVERSE CURRENT PROTECTION

RELATED APPLICATIONS

This application claims priority under 35 U.S.C. §119 to Japanese Patent Application No. 2012-043224 filed on Feb. 29, 2012, the entire content of which is hereby incorporated by reference.

BACKGROUND OF THE INVENTION

1. Field of the Invention

The present invention relates to a voltage regulator, and more particularly to a voltage regulator equipped with a reverse-current prevention function to prevent reverse current from an external power supply such as a backup battery connected to an output terminal.

2. Background Art

FIG. 3 is a circuit diagram of a voltage regulator equipped with a reverse-current prevention function.

The voltage regulator equipped with a reverse-current prevention function includes a reference voltage circuit 401, an error amplifier 402, an Nch transistor 400, Pch transistors 403, 404, 405, and 406, voltage dividing resistors 407 and 408, and a comparison circuit 430.

The source voltage (VBAT 1) is applied between a VDD terminal and a VSS terminal. A backup battery 412 and a load 413 (e.g., a semiconductor memory device) are connected to an output terminal OUT.

First, the operation of the voltage regulator when the source voltage is being supplied between the VDD terminal and the VSS terminal will be described. The relation between the source voltage and the voltage (VBAT 2) of the backup battery 412 is generally as follows: VBAT 1>VBAT 2.

The error amplifier 402 amplifies a difference voltage between feedback voltage VFB obtained by dividing output voltage VOUT of the output terminal OUT through the resistor 407 and the resistor 408 and reference voltage Vref output from the reference voltage circuit 401 to control the gate of the Pch transistor 403. The output voltage VOUT at the output terminal OUT is kept constant. The comparison circuit 430 compares the source voltage input to an input terminal 121 with the output voltage VOUT input to an input terminal 122 to output a signal to a CONTX terminal 110 and a CONT terminal 111.

FIG. 4 shows a conventional comparison circuit 430. The comparison circuit 430 is composed of a constant current circuit 103, a constant current circuit 104, a Pch transistor 101, a Pch transistor 102, an inverter 105, an inverter 106, an inverter 108, and a level shifter 107.

Since the source voltage is higher than the output voltage VOUT, the gate-source voltage of the Pch transistor 101 is higher than the gate-source voltage of the Pch transistor 102. Therefore, the voltage at the drain of the Pch transistor 102 becomes an "L" level (the voltage at the VSS terminal). The inverters 105 and 106 for waveform shaping cause the voltage at the CONT terminal 111, to which the output of the inverter 106 is connected, to become the "L" level. The voltage at the CONTX terminal 110 becomes an "H" level (source voltage) because of going through the level shifter 107 and the inverter 108. Therefore, since the Pch transistor 405 is turned ON and the Pch transistor 406 is turned OFF, the substrate voltage of the Pch transistor 403 becomes the source voltage.

Next, the operation of the voltage regulator when the supply of the source voltage is reduced will be described. The relation between the source voltage and the voltage of the backup battery 412 is as follows: VBAT 1<VBAT 2.

When the source voltage drops below the output voltage VOUT, the gate-source voltage of the Pch transistor 101 becomes lower than the gate-source voltage of the Pch transistor 102. Therefore, the potential of the drain of the Pch transistor 102 becomes an "H" level (output voltage VOUT). The inverters 105 and 106 for waveform shaping cause the voltage at CONT terminal 111 as the output of the inverter 106 to become the "H" level (output voltage VOUT). The voltage at the CONTX terminal 110 becomes an "L" level because of going through the level shifter 107 and the inverter 108. Therefore, since the Pch transistor 405 is turned OFF and the Pch transistor 406 is turned ON, the substrate voltage of the Pch transistor 403 becomes the output voltage VOUT.

In other words, the potential of the substrate (NWELL) of the Pch transistor 403 is switched to a higher side of the source voltage and the output voltage to prevent electric current from flowing from the output terminal OUT through an inter-substrate parasitic diode of the Pch transistor 403 even when the source voltage drops below the voltage at the input terminal 122 (for example, see Patent Document 1).

[Patent Document 1] Japanese Patent Application Laid-Open No. 2011-65634

SUMMARY OF THE INVENTION

However, in the conventional comparison circuit 430, the reverse current flowing from the input terminal 122 is minimized and hence the circuit response speed is slow. This arises a problem that the signal for switching the substrate voltage of the Pch transistor 403 against a sharp voltage fluctuation is delayed. For example, when the source voltage rises sharply, electric current flows from the VDD terminal to the output terminal OUT through the inter-substrate parasitic diode of the Pch transistor 403 during the delay in the switching signal, resulting in causing an overshoot at the output terminal OUT.

Therefore, it is an object of the present invention to solve the above problem and provide a voltage regulator equipped with a reverse-current prevention function capable of ensuring safe performance without causing a large overshoot at an output terminal OUT against a sharp fluctuation in source voltage.

The voltage regulator equipped with a reverse-current prevention function of the present invention is configured such that a source voltage fluctuation detecting circuit for detecting a rise of source voltage is provided in a comparison circuit for comparing source voltage with output voltage, and when the source voltage rises sharply, current through a constant current circuit for limiting the consumption current of the comparison circuit is increased to improve the response characteristics.

According to the voltage regulator equipped with a reverse-current prevention function of the present invention, since the comparison circuit for comparing the source voltage with the output voltage includes a circuit for detecting a rise of the source voltage, the circuit controls the constant current circuit for limiting the consumption current, there is an advantage of being able to switch the substrate potential of a Pch transistor with a response speed enough for a fluctuation in source voltage without steadily increasing reverse current flowing into an output terminal.

DETAILED DESCRIPTION OF THE PREFERRED EMBODIMENT

An embodiment for carrying out the present invention will be described with reference to the accompanying drawings.

Figure 3:
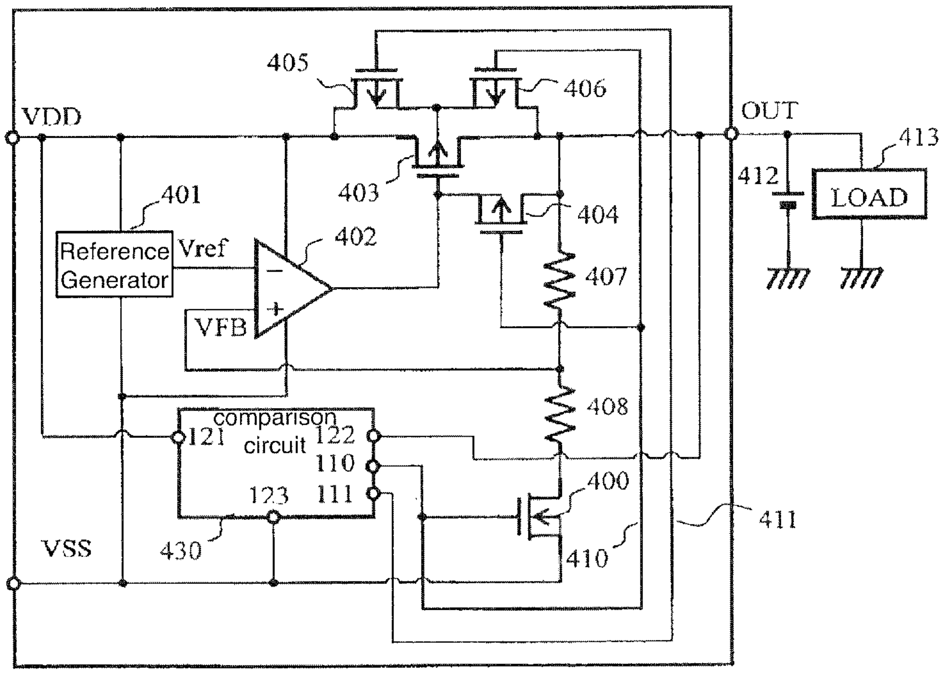
FIG. 3 is a circuit diagram of a voltage regulator of the present invention.
Figure 4:
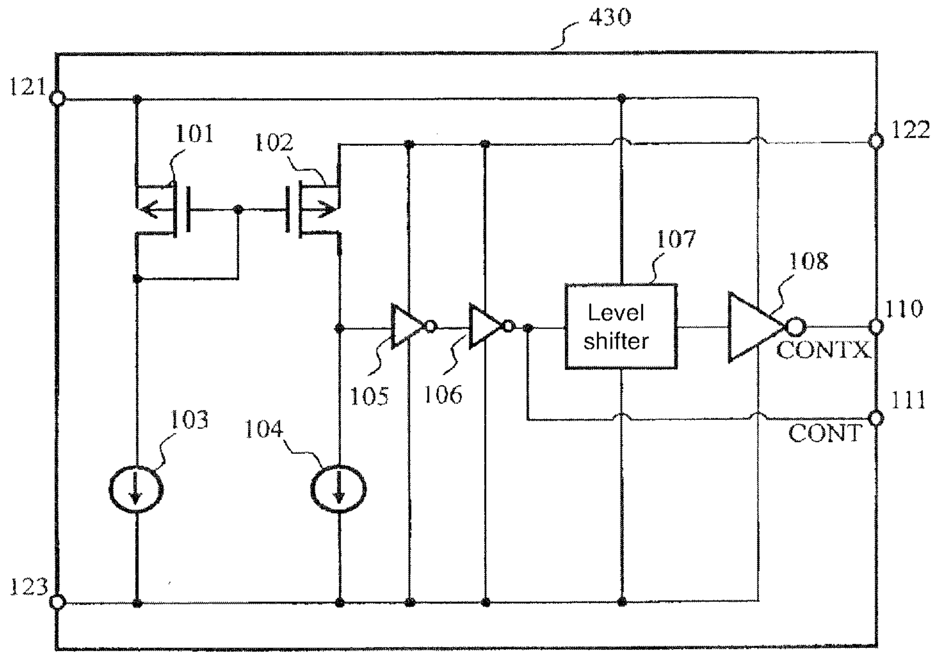
FIG. 4 PRIOR ART
FIG. 4 is a circuit diagram of a conventional comparison circuit.

As shown in FIG. 3, a voltage regulator equipped with a reverse-current prevention function according to the present invention includes a reference voltage circuit 401, an error amplifier 402, an Nch transistor 400, Pch transistors 403, 404, 405, and 406, voltage dividing resistors 407 and 408, and a comparison circuit 430.

The Pch transistor 403 as an output transistor is connected between a VDD terminal and an output terminal OUT. The voltage dividing resistors 407 and 408, and the Nch transistor 400 are connected in series between the output terminal OUT and a VSS terminal. The error amplifier 402 is configured such that the output terminal of the reference voltage circuit 401 is connected to an inverting input terminal thereof, a connection point between the voltage dividing resistors 407 and 408 is connected to a non-inverting input terminal thereof, and an output terminal thereof is connected to the gate of the Pch transistor 403. The comparison circuit 430 is configured such that the VDD terminal is connected to an input terminal 121 thereof, the output terminal OUT is connected to an input terminal 122 thereof, the VSS terminal is connected to an input terminal 123 thereof, an output terminal 110 thereof is connected to the gates of the Nch transistor 400 and the Pch transistors 404 and 406, and an output terminal 111 thereof is connected to the gate of the Pch transistor 405. The source and drain of the Pch transistor 405 are connected to the VDD terminal and the substrate of the Pch transistor 403. The source and drain of the Pch transistor 406 are connected to the output terminal OUT and the substrate of the Pch transistor 403. The source and drain of the Pch transistor 404 are connected to the output terminal OUT and the gate of the Pch transistor 403.

The source voltage (VBAT 1) is applied between the VDD terminal and the VSS terminal. A backup battery 412 and a load 413 (e.g., semiconductor memory device) are connected to the output terminal OUT.

Figure 1:
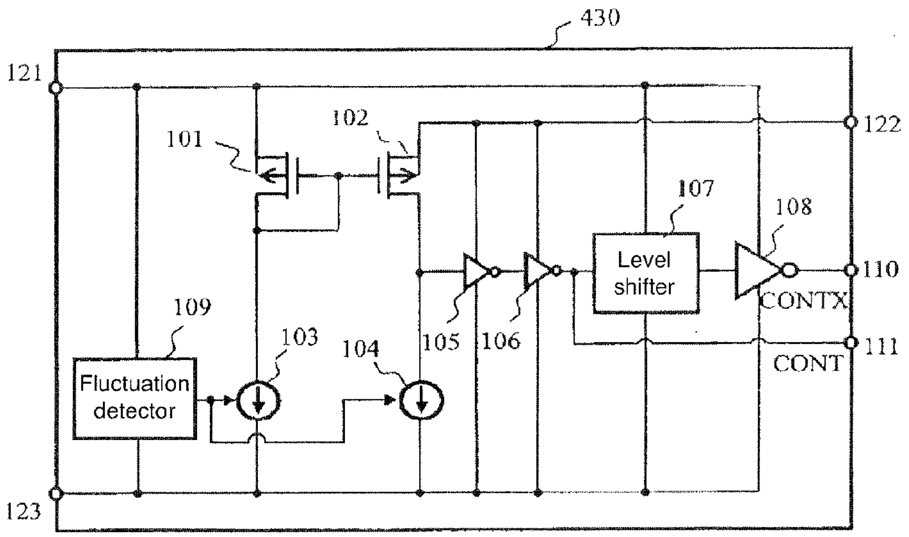
FIG. 1 is a circuit diagram of a comparison circuit in a voltage regulator of the present invention.

FIG. 1 is a circuit diagram of the comparison circuit in the voltage regulator according to the present invention. The comparison circuit 430 includes a Pch transistor 101, a Pch transistor 102, a constant current circuit 103, a constant current circuit 104, an inverter 105, an inverter 106, an inverter 108, a level shifter 107, and a source voltage fluctuation detecting circuit 109.

The Pch transistor 101 is configured such that the gate is connected to the drain thereof, the gate of the Pch transistor 102, and the constant current circuit 103, and the source is connected to the VDD terminal. The Pch transistor 102 is configured such that the drain is connected to the inverter 105 and the constant current circuit 104, and the source and back gate are connected to the input terminal 122. The source voltage fluctuation detecting circuit 109 is connected between the VDD terminal and the VSS terminal 123, and an output terminal thereof is connected to the constant current circuit 103 and the constant current circuit 104. The inverter 105 and the inverter 106 are connected in series so that power will be supplied from the input terminal 122. The output of the inverter 106 is connected to the level shifter 107 and a CONT terminal 111. The output of the level shifter 107 is connected to a CONTX terminal 110 through the inverter 108. Power is supplied to the level shifter 107 and the inverter 108 from the VDD terminal.

Next, the operation of the voltage regulator equipped with a reverse-current prevention function will be described.

First, the operation of the voltage regulator when the source voltage is being supplied between the VDD terminal and the VSS terminal will be described. The relation between the source voltage and the voltage (VBAT 2) of the backup battery 412 is as follows: VBAT 1>VBAT 2.

The error amplifier 402 amplifies a difference voltage between feedback voltage VFB, obtained by dividing output voltage VOUT of the output terminal OUT through the resistor 407 and the resistor 408, and reference voltage Vref output from the reference voltage circuit 401 to control the gate of the Pch transistor 403. The output voltage VOUT of the output terminal OUT is kept constant. The comparison circuit 430 compares the source voltage input to the input terminal 121 with the output voltage VOUT input to the input terminal 122 to output a signal to the CONTX terminal 110 and the CONT terminal 111.

Since the source voltage is higher than the output voltage VOUT, the gate-source voltage of the Pch transistor 101 is higher than the gate-source voltage of the Pch transistor 102. Therefore, the voltage of the drain of the Pch transistor 102 becomes an “L” level (the voltage at the VSS terminal). The inverters 105 and 106 for waveform shaping cause the voltage at the CONT terminal 111, to which the output of the inverter 106 is connected, to become the “L” level. The voltage at the CONTX terminal 110 becomes an “H” level (source voltage) because of going through the level shifter 107 and the inverter 108. Therefore, the Nch transistor 400 is turned ON and the Pch transistor 404 is turned OFF. In other words, the voltage regulator operates normally.

Further, since the Pch transistor 405 is turned ON and the Pch transistor 406 is turned OFF, the substrate voltage of the Pch transistor 403 becomes the source voltage.

Next, the operation of the voltage regulator when the supply of the source voltage is reduced will be described. The relation between the source voltage and the voltage of the backup battery 412 is as follows: VBAT 1<VBAT 2.

When the source voltage drops below the output voltage VOUT, the gate-source voltage of the Pch transistor 101 becomes lower than the gate-source voltage of the Pch transistor 102. Therefore, the potential of the drain of the Pch transistor 102 becomes an “H” level (output voltage VOUT). The inverters 105 and 106 for waveform shaping cause the voltage at the CONT terminal 111 as the output of the inverter 106 to become the “H” level (output voltage VOUT). The voltage at the CONTX terminal 110 becomes an “L” level because of going through the level shifter 107 and the inverter 108. Therefore, the Nch transistor 400 is turned OFF and the Pch transistor 404 is turned ON. Even when the source voltage drops to make the output of the error amplifier 402 unstable, since the “H” level of voltage is applied to the gate of the Pch transistor 403 by means of the Pch transistor 404, the Pch transistor 403 can be maintained in the OFF state.

Further, since the Pch transistor 405 is turned OFF and the Pch transistor 406 is turned ON, the substrate voltage of the Pch transistor 403 becomes the output voltage VOUT. In other words, the potential of the substrate (NWELL) of the Pch transistor 403 is switched to a higher side of the source voltage and the output voltage to prevent electric current from flowing from the output terminal OUT through an inter-substrate parasitic diode of the Pch transistor 403 even when the source voltage drops below the output voltage VOUT.

Next, the operation of the voltage regulator when the source voltage rises sharply in this condition will be described. Although the potential of the drain of the Pch transistor 102 becomes the "L" level (the potential of the VSS terminal), the time required for the switching is limited by the constant current circuit 104. The source voltage fluctuation detecting circuit 109 detects a source voltage fluctuation to control current flowing into the constant current circuit 103 and the constant current circuit 104 according to the fluctuation. In other words, when the voltage at the VDD terminal rises sharply, the current flowing into the constant current circuit 103 and the constant current circuit 104 is temporarily increased to reduce the time for switching the potential of the drain of the Pch transistor 102 to the "L" level.

As described above, according to the voltage regulator of the present invention, the source voltage fluctuation detecting circuit 109 detects a sharp fluctuation in source voltage and temporarily increases the current flowing into the constant current circuit 103 and the constant current circuit 104 to reduce the switching time of the signal to the CONT terminal 111 and the CONTX terminal 110, enabling the reverse-current prevention function to work promptly. This can prevent the occurrence of overshoot at the VOUT terminal 122 without affecting the operating time of the backup battery 412.

Figure 2:
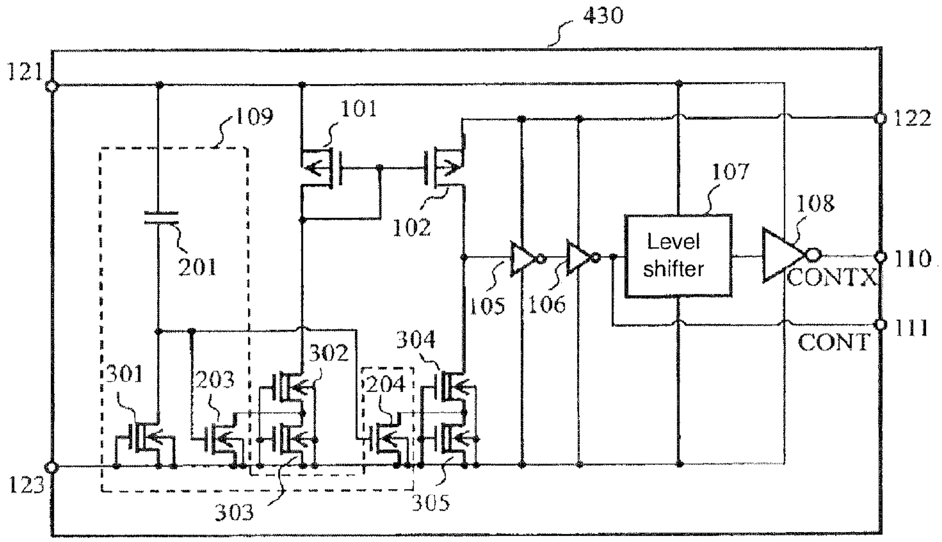
FIG. 2 is a circuit diagram showing an example of a source voltage fluctuation detecting circuit in the comparison circuit of the voltage regulator of the present invention.

FIG. 2 is a circuit diagram showing an example of the source voltage fluctuation detecting circuit in the comparison circuit of the voltage regulator of the present invention.

The source voltage fluctuation detecting circuit 109 is composed of a capacitance 201 and a depression-type Nch transistor 301 as a resistance element, which are connected in series between the VDD terminal and the VSS terminal, and Nch transistors 203 and 204. The constant current circuit 103 and the constant current circuit 104 are composed of depression-type Nch transistors 302, 303 and depression-type Nch transistors 304, 305, respectively.

The capacitance 201 and the depression-type Nch transistor 301 function as a differentiating circuit to control the gates of the Nch transistors 203 and 204 according to the fluctuation at the VDD terminal. In other words, when the source voltage rises sharply, since the voltage of the drain of the depression-type Nch transistor 301 rises to raise the voltage of the gates of the Nch transistors 203 and 204 and turn them on, the current through the constant current circuit 103 and the constant current circuit 104 increases. This can reduce the switching time of the signal to the CONT terminal 111 and the CONTX terminal 110, enabling the reverse-current prevention function to work promptly.

Note that the circuitry including the inverter 105 and subsequent elements is not limited to this circuit diagram as long as a signal after being subjected to waveform shaping and level conversion can be output.

Further, since the depression-type Nch transistor 301 functioning as a resistance element of the differentiating circuit is of the same depression-type Nch as the depression-type Nch transistors 302 to 305 that make up the constant current circuits, they are correlated with each other in terms of variability in the process of manufacture. For example, when the threshold voltage of the depression-type Nch transistor drops, the response time of the comparison circuit 430 is slowed down steadily but quickened against the source voltage fluctuation. This allows the responsiveness of the comparison circuit 430 to be relatively less correlated with the variability in the process of manufacture. Therefore, the transistors that make up the resistance element in the differentiating circuit and the constant current circuits are not limited to those mentioned above as long as they are correlated with each other in terms of the variability in the process of manufacture.

What is claimed is:

1. A voltage regulator comprising:

an output transistor provided between a power supply terminal and an output terminal;

an error amplifier for comparing a reference voltage with a voltage based on a voltage at the output terminal to control a gate voltage of the output transistor so as to keep the voltage at the output terminal constant;

a first transistor for connecting a substrate of the output transistor to the power supply terminal;

a second transistor for connecting the substrate of the output transistor to the output terminal; and a comparison circuit for controlling switching between the first transistor and the second transistor depending on a result of voltage comparison between the power supply terminal and the output terminal, the comparison circuit including:

a third transistor of which a source is connected to the power supply terminal, a gate is connected to a drain thereof, and the drain is connected to a first constant current circuit;

a fourth transistor of which a source is connected to the output terminal, a gate is connected to the gate of the third transistor, and a drain is connected to a second constant current circuit; and a source voltage fluctuation detecting circuit of which an input terminal is connected to the power supply terminal, wherein the source voltage fluctuation detecting circuit is configured to temporarily increase current flowing through the first and the second constant current circuits from a steady state current when the source voltage suddenly rises from a steady state voltage, and to allow the first and the second constant current circuits to decrease to the steady state current after the source voltage returns to the steady state voltage, wherein gates of the first transistor and the second transistor are controlled by a voltage at a connection point between the fourth transistor and the second constant current circuit to switch a substrate voltage of the output transistor to a higher side of the voltages at the power supply terminal and the output terminal.

2. The voltage regulator according to claim 1, wherein the source voltage fluctuation detecting circuit includes:

a capacitance element and a resistance element connected in series between the power supply terminal and a grounding terminal; and a fifth transistor and a sixth transistor of which gates are controlled by a voltage of the resistance element to control current of the first constant current circuit and the second constant current circuit.

3. The voltage regulator according to claim 2, wherein the resistance element is an element of a type identical to elements that make up the first constant current circuit and the second constant current circuit.

* * * * *